United States Patent [19]

Swift et al.

[11] 3,856,410

[45] Dec. 24, 1974

[54] METHOD AND APPARATUS FOR TESTING BLADED ROTORS

[75] Inventors: Gilbert Swift, Bryan; William M. Moore, College Station; Lionel J. Milberger, Bryan, all of Tex.

[73] Assignee: Martin Tracker Corporation, College Station, Tex.

[22] Filed: Nov. 27, 1972

[21] Appl. No.: 309,892

[52] U.S. Cl. ......... 356/167, 178/DIG. 36, 250/560, 178/DIG. 20
[51] Int. Cl. ......................................... G01b 11/02
[58] Field of Search .......... 356/178, 167, 172, 170, 356/138; 250/231 R, 233, 560; 73/71.3; 178/DIG. 20, DIG. 33; 428/358 AA

[56] References Cited
UNITED STATES PATENTS

| | | | |
|---|---|---|---|
| 2,932,482 | 4/1960 | Dickie | 248/358 AA |
| 2,969,477 | 1/1961 | Gebel | 178/DIG. 33 |
| 3,002,420 | 10/1961 | Willits et al. | 356/167 |
| 3,012,468 | 12/1961 | Magill et al. | 356/138 |
| 3,023,317 | 2/1962 | Willits et al. | 356/167 |
| 3,211,051 | 10/1965 | Frei et al. | 356/97 |
| 3,282,093 | 11/1966 | Rehder | 73/71.3 |
| 3,316,759 | 5/1967 | Rehder | 73/71.3 |
| 3,334,848 | 8/1967 | Iwai | 248/358 AA |
| 3,341,653 | 9/1967 | Kruse | 178/33 |
| 3,379,826 | 4/1968 | Gray | 178/7.1 |
| 3,617,759 | 11/1971 | Martin | 250/277 |

FOREIGN PATENTS OR APPLICATIONS 1,446,960  6/1966  France ........................... 244/17.11

OTHER PUBLICATIONS

Portions of 1973 Tektronix Corp. Oscilloscope Catalog (1973) pp. 38, 39, 50. 53. 74 Copyright 1972.
Pearson and Dennis, "A Simple Motion Detector for Television Signals," Society of Motion Picture and Television Engineers (Journal of), V82, pp. 17-21, 1/73.

*Primary Examiner*—Ronald L. Wibert
*Assistant Examiner*—Paul K. Godwin

[57] ABSTRACT

To test rotating bladed rotors, an optical image is formed of each successive blade-tip as it passes a selected azimuth. Electro-optical apparatus derives signals related to the relative positions of the successive images. These signals are displayed to provide a measure of the relative axial displacements of the several blades. Electrical means are provided for calibration of the axial distances being measured and for identifying each particular blade with the corresponding displacement indication.

17 Claims, 8 Drawing Figures

Patented Dec. 24, 1974

METHOD AND APPARATUS FOR TESTING BLADED ROTORS

This invention relates to a novel apparatus and method for testing bladed rotors. More particularly, this invention relates to an apparatus and method for measuring the distances by which the tips of the several blades are out-of-track. The out-of-track distance is the distance in the axial direction, by which the tip of one blade fails to occupy the same position as that of another as the rotor turns. A perfectly adjusted rotor is one whose several blades successively occupy identical positions as the rotor turns on its axis. Imperfection, as evidenced by the blade tips being out-of-track gives rise to unbalanced forces which cause serious vibration. This vibration results in excessive pilot fatigue as well as premature failure of rotor components. This is a particularly serious problem in helicopters which require a high degree of pilot coordination and rely upon a bladed rotor for their support. Accordingly, in order to minimize vibrations which are detrimental to both the pilot and the structure of the helicopter, as well as annoying to the passengers, it is necessary to readjust frequently the blades of helicopter lift rotors in order to minimize their out-of-track distances.

Heretofore such adjustments have been based on crude measurements obtained while the helicopter is on the ground, by observing the heights at which the blade tips rub against a piece of cloth stretched on a handheld pole, or based on visual estimates obtained during flight by observing reflectors attached to the blades which are illuminated stroboscopically from within the helicopter.

Accordingly, it is an object of the present invention to provide an improved method and appparatus for measuring rotor blade out-of-track distance. Briefly stated the invention provides a method for measuring rotor blade out-of-track distance which includes the steps of forming an optical image of each successive blade tip as it passes a selected azimuth and deriving therefrom a succession of electrical signals whose difference is proportional to the axial displacement of the successive blade tips. These signals are then compared with each other and with a calibration signal to provide a measure of the out-of-track distance of each blade. An identification signal is also generated in synchronism with the rotor whereby the electrical signal produced by the image of a particular blade may be identified with that blade.

It is therefore another object to identify the respective electrically derived signals with the particular blades whose positions they represent.

A further object is to derive positionally indicative signals which are independent of the illumination intensity of the blades and of their background.

It is a further object to derive such signals independent of vibration of the vehicle and of the apparatus mounted thereon.

Still another object is to provide a method of calibration whereby the electrically derived signals can be interpreted in terms of the actual distances by which the blade tips fail to track each other.

It is also an object to perform the tests on bladed rotors without making any physical attachment to the rotor blades and particularly without altering their appearance or condition in any way.

The novel features of the present invention are set forth in particularly in the appended claims. The present invention both as to its organization and manner of operation together with other objects and advantages thereof may best be understood by way of illustration and example of certain embodiments when taken in conjunction with the accompanying drawings in which:

Figure 1:
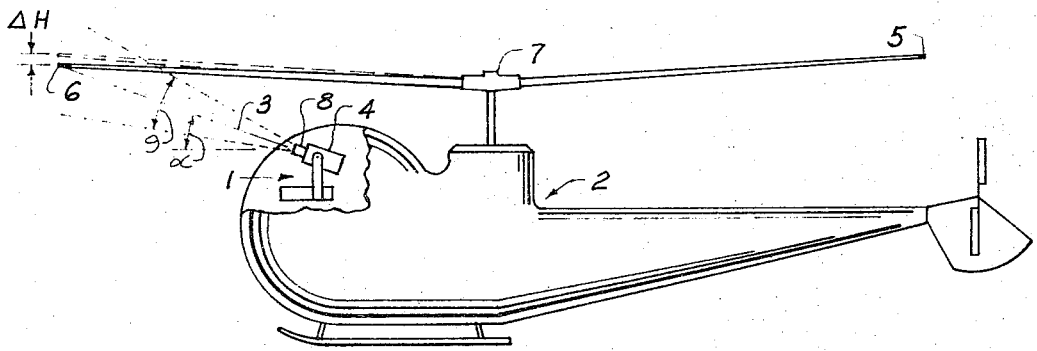
FIG. 1 is a diagrammatic elevational view of a helicopter together with the measuring device of the present invention.
Figure 2:
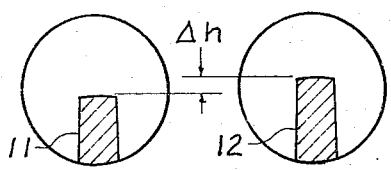
FIG. 2 is a representation of the optical images at the respective instants when two different blades are passing through the center of the field of view of the measuring device.

Referring now specifically to FIG. 1, the measuring device 1 is shown mounted within the helicopter 2. The optical axis 3 of the optical head 4 of the measuring device 1 is aimed at an area through which the blade tips 5 and 6 of rotor 7 pass during each rotation of the rotor. The dotted line indicates the position of the blade whose tip is designated 5 after it has undergone rotation through 180°. In this rotated position it can be seen that its tip is out-of-track with the blade tip 6 by the distance $\Delta H$. A lens 8, which is focused on the area through which blade tips 5 and 6 pass, forms an optical image on an image plane within the optical head 4. Most of the time, when no blade is present within the field of view 9 of the lens 8, the image is a bright image of a portion of the sky. During the passage of each blade tip through the field of view 9 a relatively dark image of that blade tip sweeps across the image plane. If the blades are out-of-track by a distance $\Delta H$ the respective images of the blade tips will be displaced in the image plane a distance, $\Delta h$, as shown in FIG. 2. More specifically, the images 11 and 12 of blade tips 5 and 6 respectively, at the instant when each blade tip is at the center of the field of view, are displaced by a distance $\Delta h$ which is equal to $\Delta H \cos\alpha$ multiplied by the optical demagnification of the lens 8. Since, to a very close approximation the demagnification is equal to $F/r$ where F is the focal length of the lens 8 and r is the distance from the lens 8 to the blade tip, the image displacement, $\Delta h$, may be taken as equal to $\Delta H \cos\alpha \, F/r$. Since $F$, $r$ and $\alpha$ are known quantities, the actual out-of-track distance, $\Delta H$, can be measured by measuring the image displacement $h$ and multiplying it by the appropriate factor, which is equal to $r/F \cos\alpha$.

Measurement of the image displacement, $\Delta h$, can be accomplished in several different ways. One way makes use of an image dissecting element of the basic type described by Martin in U.S. Pat. No. 3,617,769. Such an element, which consists of a square or rectangular aperture suitably coupled to a photosensitive detector, produces an electrical signal which is linearly proportional to the amount of its area which is illuminated. Hence, placing one such element in the image plane at a location such that the blade tip images fall within its area when they are centered within the field of view of the lens serves to produce a fluctuating electrical signal whose successive minima are respectively proportional to the axial displacement of the several rotor blades. Accordingly, the difference between one minimum and another is proportional to $\Delta H$, the out-of-track distance which it is desired to measure.

Figure 3:
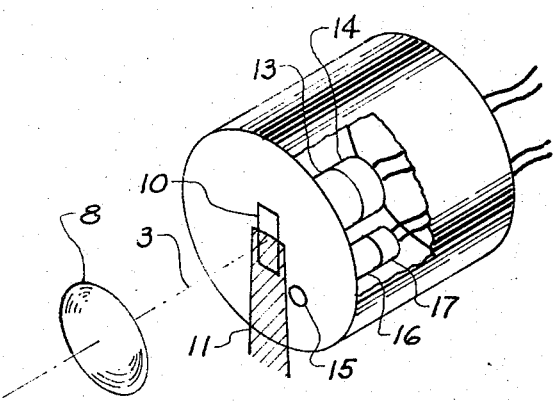
FIG. 3 shows the lens, aperture and light receiving elements which are contained within one embodiment of the measuring device.

The construction of this image dissecting element is shown in FIG. 3. It comprises an enclosure having a flat surface in the plane of the image formed by the lens 8. A rectangular aperture 10, in the image plane, receives a portion of light constituting the image. The dimensions of aperture 10 should be such that its width is less than the width of the blade image and its height is sufficient to accommodate the expected movement of the blade tip images. Light entering the aperture 10 is collected and conducted by light transmitting means 13 to the photosensitive detector 14. An auxiliary photosensitive detector 17 is positioned to intercept each blade tip image just prior to the arrival of that image on the aperture 10, in order to generate a trigger signal the purpose of which will be explained later.

Figure 4:
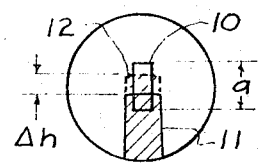
FIG. 4 is a representation of two successive blade-tip images in relationship to the aperture of an image dissecting element of the type shown in FIG. 3.
Figure 5:
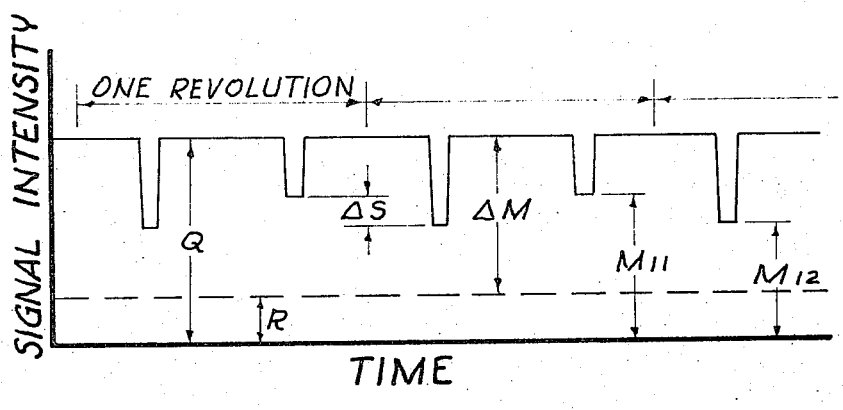
FIG. 5 is a graphical representation of the variation with time of the output signal derived during a few revolutions of a two-bladed rotor.

Referring now to FIG. 4, the rectangular aperture 10 which is located in the image plane admits light from that portion of the image which falls within its area. During the time when no blade is within the corresponding portion of the field of view it receives light from the sky. As each relatively dark blade image sweeps across the aperture 10 the amount of light which enters the aperture is diminished in proportion to the amount of area covered by that particular blade image. Thus, when the image 12 of blade tip 6 is centered on the aperture 10, the amount of light is diminished more than when the image 11 of blade tip 5 is centered on the aperture. Furthermore, the difference in these two amounts of light is proportional to the image displacement $\Delta h$. Accordingly, the electrical signal produced by the photosensitive device 14 which is coupled to the aperture 10 undergoes a corresponding sequence of fluctuations during each rotation of the rotor 7. As shown in FIG. 5, during each revolution of the rotor 7, a maximum signal, Q, which is proportional to the brightness of the sky, occurs throughout the time that no portion of a blade image falls on the aperture 10. Minimum signals, $M_{11}$ and $M_{12}$, occur during the passage of blade images 11 and 12 respectively across the aperture and the difference, $\Delta S$, between successive minima is proportional to the out-of-track distance between successive blades. Also indicated in FIG. 5 is the dark level, R, which is the signal which would occur if a blade image completely covered the aperture 10. The dark level is not zero because the blades, while much darker than the sky, are not completely black. Upon consideration of FIG. 4 together with FIG. 5 it will become apparent that the ratio of the difference, $\Delta S$, between the signal minima to the difference, $\Delta M$, between the maximum signal, Q, and the dark level, R, which is to say $\Delta S/\Delta M$, is equal to the ratio of the image displacement $H \cos\alpha F/r$, to the aperture height, $a$.

Thus: $\Delta S/\Delta M = \Delta H \cos\alpha \, F/ar$, from which $$\Delta H = \Delta S/\Delta M \cdot ar/F \cos\alpha$$

Accordingly, since $\alpha$, $F$, $r$ and $a$ are known quantities, the out-of-track distance $H$ can be measured by determining the ratio $\Delta S/\Delta M$. This can be done simply by measuring $\Delta S$ and separately measuring $\Delta M$ and then forming their ratio. However, this is not the preferred way since it does not lead to a direct reading instrument. For the sake of simplicity, however this way will be explained first. The difference $\Delta S$ between the signal minima due to the blades can be read directly from a calibrated oscilloscope display or oscillograph tracing. Alternatively, an adjustable signal of known magnitude can be switched on during each passage of the image of one selected blade. When this signal is added to the signal shown in FIG. 5, the sum of the minimum signal due to the selected blade and this adjustable signal can be made to equal the minimum signal due to any other blade. Upon achieving such equality the magnitude of the adjustable signal is equal to $\Delta S$ and thus serves as a measure of $\Delta S$. The magnitude of $\Delta M$ can also be measured conveniently on the same oscilloscope or oscillograph tracing. This is done by raising the aim of the optical head 4 until the blade images completely fill the area of aperture 10 during each passage. The difference between the maximum and minimum excursions of the signal is then equal to $\Delta M$.

Figure 6:
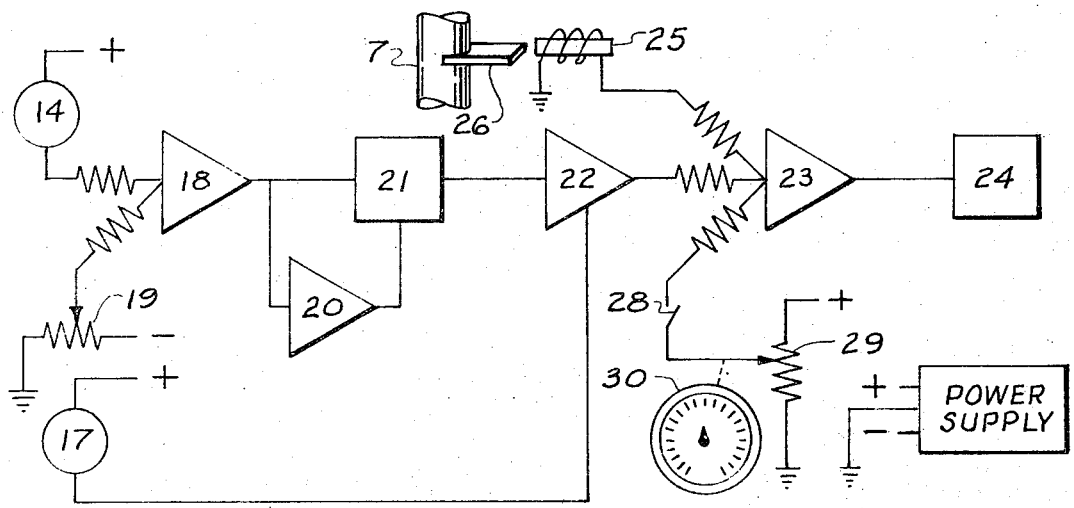
FIG. 6 is a schematic block diagram of the electronic apparatus utilized in conjunction with the aperture shown in FIG. 3 to record out-of-track measurements.
Figure 7:
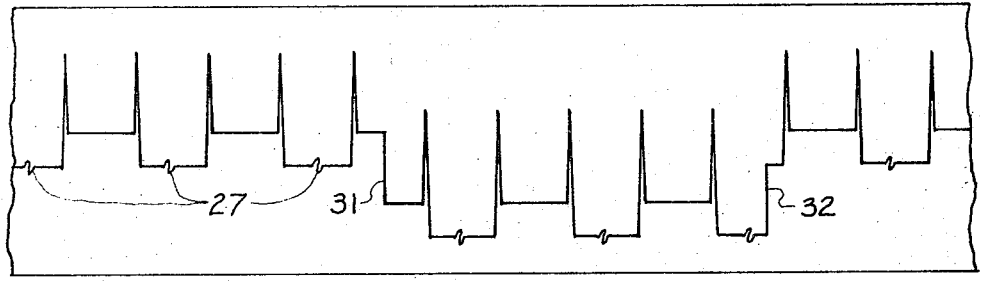
FIG. 7 is a typical oscillographic record showing an out-of-track condition of a two-bladed rotor, identification signals used to identify a particular blade, and showing the application and removal of a calibration signal.

Rather than measure $\Delta S$ and $\Delta M$ separately it is preferred to produce a signal which is directly proportional to the out-of-track distance and independent of the sky illumination level and of the dark level. This is accomplished by generating a steady signal proportional to $\Delta M$ and utilizing it together with the fluctuating signal of FIG. 5 in an electronic divider circuit to form their ratio. Referring now to FIG. 6, the photosensitive device 14, which receives light from aperture 10 and generates a signal of the type shown in FIG. 5, is connected to a summing amplifier 18 into which is also fed an adjustable continuous signal of opposite polarity. Adjustment of potentiometer 19 permits the combined input to the summing amplifier 18 to be made equal to zero when the output of the photosensitive device 14 is at the dark level. The output of the summing amplifier 18 is then proportional to $\Delta M$ during the time that no blade image falls on the aperture 10. The peak holding amplifier 20 which is fed from summing amplifier 18 produces a substantially unfluctuating signal of similar magnitude. This steady signal proportional to $\Delta M$ is applied to the electronic divider 21 as the denominator signal while the fluctuating output of summing amplifier 18 is applied as the numerator signal. The output of the electronic divider 21 is thus a fluctuating signal with minima whose difference is proportional to the ratio $\Delta S/\Delta M$. This difference is proportional to the image displacement and is independent of the brightness of the sky. Accordingly, since the image displacement bears a known relationship to the out-of-track distance, the oscilloscope display or an oscillograph trace of the output of the electronic divider 21 can be used directly to measure the out-of-track distance of the rotor blade tips. However, the time of passage of a blade tip image across the aperture 10 is very brief and this tends to make it difficult to observe or record the successive brief minimum signal magnitudes. This difficulty is overcome by applying the fluctuating signal derived from electronic divider 21 to another peak holding amplifier 22 which maintains its output substantially constant after reaching a minimum, until restored to maximum by a trigger signal and thus made ready to receive and hold a new minimum, just prior to the occurrence of each sweep of a blade image across the aperture 10. The required trigger signal is generated by an auxiliary photosensitive device 17 positioned in the image plane of the optical head 4, so as to intercept the blade image shortly before this image reaches the aperture 10. The output of the peak holding amplifier 22 is therefore a series of relatively long steps of constant signal level whose difference is proportional to $\Delta S/\Delta M$ and therefore proportional to $\Delta H \cos\alpha \; F/ar$, interspersed by relatively brief excursions to the maximum signal level. These long steps are easily observed or recorded on conventional oscilloscopes and oscillographic recorders. In the apparatus of FIG. 6 they are applied through another summing amplifier 23 to drive oscillographic recorder 24 which produces a record of the form shown in FIG. 7. In FIG. 7 it will be observed that alternate steps of the recording have superimposed on them an identification marking which permits each step of the record to be identified with one particular blade tip. In the apparatus of FIG. 6 a stationary magnetic pickup 25 cooperates with a steel finger 26, which rotates with the shaft of the helicopter rotor 7, to produce a signal impulse once per revolution of the rotor 7, at a preselected azimuth. For example, the pickup 25 may be positioned to generate an impulse whenever blade tip 5 has travelled 90 degrees beyond its intersection with the optical axis 13. Under this condition the signal impulse generated by the pickup 25 will occur during the time that the recorder 24 is recording a step derived from the blade tip 5. The impulse from the pickup 25 is applied to the summing amplifier 23 whereby it adds to the stepwise signal to produce the desired identification markings 27 on the record of the oscillographic recorder 24.

The apparatus also feeds into summing amplifier 23 a calibration signal which may be switched on or off by operation of the push-button switch 28. The magnitude of the calibration signal is adjustable by means of potentiometer 29 which is equipped with a graduated dial 30. In operating the device the dial 30 is set to a predetermined position, appropriate to the range $r$ and the elevation angle $\alpha$ being used. At this position the calibration signal is of such magnitude that upon closing the push-button switch 28 the recorder trace undergoes a displacement equal to that caused by an out-of-track distance of one inch. Accordingly, upon pressing and then releasing push-button switch 28 a downward displacement followed by an equal upward displacement is produced on the record. FIG. 7 shows these displacements designated 31 and 32 respectively. The actual out-of-track distance of the blades 5 and 6 is measured by comparing the difference in height between succession steps of the recording produced by the blades 5 and 6 with either of the displacements 31 or 32. In the example shown in FIG. 7 it can be seen that the out-of-track distance is approximately ½ inch.

Figure 8:
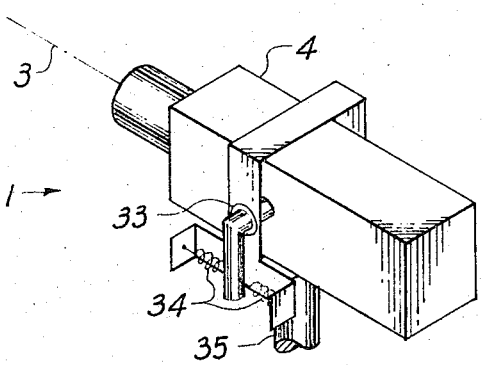
FIG. 8 is an enlarged view of the measuring device within the helicopter showing details of its vibration isolator.

Referring now to FIG. 8, the optical head 4 is isolated from vibrations of the helicopter which might tend to disturb the aim of its optical axis 3. If the optical axis 3 was permitted to vibrate in synchronism with the rotation rate of the rotor it might produce a false indication of the amount by which the blades are out of track. Accordingly the optical head 4 is permitted to rotate about the axis of a horizontal pivot 33, which axis is in line with the center of gravity of the optical head 4. Rotation about this axis is constrained by springs 34, such that the natural period of vibration of the optical head 4, about this axis, is long in comparison with the period of one rotation of the helicopter rotor 7. This disparity of periods provides the isolation necessary to maintain the desired aim independent of vibrations of the supporting member 35 which would otherwise disturb the aim.

An alternative form of the device makes use of a scanning type of photosensitve tube, generally resembling a television camera tube instead of the image dissector element of the Martin U.S. Pat. No. 3,617,759. One suitable tube is that manufactured by I.T.T. and known as Type FW129. An electro-optical assembly utilizing such a tube is marketed by Optron Corporation and is known as their Model 501, Electro-Optical Displacement Follower.

The photocathode of this scanning tube is placed in the image plane of the lens where its light sensitive surface receives optical images exactly as previously described and as shown in FIG. 2. Inside the scanning tube a corresponding electron-image is formed. This electron-image is repetitively deflected upward and downward through a fixed distance, of the order of one quarter inch, at the rate of about 30,000 cycles per second by application of a current, which varies at this frequency, to a set of deflection coils placed adjacent to the sides of the tube. A central pin-hole in a barrier placed within the tube admits electrons from only one very small portion of the electron image. However, since the electron-image is being deflected repetitively across the pin-hole, this pin-hole, in effect, scans along a vertical line of the electron image. The electrons admitted by the pin-hole are amplified by an electron-multiplier to produce a substantial output signal.

During the time that only the bright sky is within the field of view of the lens the output of the scanning tube will be substantially constant but when any portion of the image of a dark blade tip reaches the line which is being scanned the output signal will undergo an abrupt decrease at a specific instant during the next scan. This decrease produced by the I.T.T. or Optron device can be employed to command a "sample-and-hold" amplifier to sample the current in the scanning coil at this instant and to hold its output at this value until commanded to sample again. Since this current is proportional to the position of the electron image, the output of the "sample-and-hold" amplifier is therefore a function of the position of that portion of the blade tip image which is being scanned. Successive scans will ordinarily encounter the blade tip image at successively higher positions in the image plane resulting in successively greater values of the output of the sample and hold amplifier, until the blade tip image passes beyond the center of the field of view. During this time the successive samples will diminish and finally cease until the next blade tip image enters the field of view. In order to measure the out of track distance between successive blades, the maximum sample obtained by the sample-and-hold amplifier during the passage of one blade tip image through the field of view is stored in a peak-holding amplifier until the arrival of the next blade tip image. The output of this peak-holding amplifier thus acquires a succession of values each of which corresponds to the height of the succession of blade tip images on the photocathode, and hence produces an output signal like that of FIG. 7, from which the out-of-track distance can be read. A trigger signal which restores the peak-holding amplifier to zero prior to the passage of each blade tip image through the field of view may be obtained the same way as was described in connection with the apparatus of FIG. 6, namely from an auxiliary photosensitive device (17) positioned to intercept the blade image shortly before that image reaches the photocathode of the scanning tube.

It will be noted that the vertical scanning of the scanning tube must be performed at a rate which is sufficiently greater than the rotational rate of the rotor in order that a substantial number of scans occur during the passage of each blade tip through the field of view. This is necessary in order to assure obtaining a representative measure of the maximum height of its image during each passage through the field of view.

Accordingly, the apparatus used to derive and display indications of the out-of-track distance can be either of the type employing the Martin principle or the type employing the scanning tube.

The invention having been described, what is claimed is:

1. A method for measuring the distances by which the unmodified tips of a several bladed rotor are out-of-track, comprising:
    forming an optical image of the area through which each successive blade tip travels as it passes a selected azimuth;
    deriving therefrom in synchronism with the rotor a succession of first electrical signals, the maximum amplitude of said first electrical signals being proportional to the brightness of the sky, said succession containing said first electrical signals, the comparative amplitudes of which are representative of the comparative axial position of each successive blade tip;
    comparing selected portions of said first electrical signals to produce therefrom a succession of second electrical signals the amplitudes of which are proportional to the axial position of each successive blade tip, said amplitudes of said second electrical signals being independent of the brightness of the sky;
    generating an identification signal in synchronism with the rotor whereby the portion of said second electrical signal produced by the passage of a particular blade can be identified, and
    obtaining from each second electrical signals and the identification signal a comparative indication of the out-of-track distance of each other blade with respect to said particular blade.

2. The method specified in claim 1 including:
    generating a calibration signal the amplitude of which is adjusted in relationship to the specific existing relationship between any axial displacement of the blade tips and the amount of change produced thereby in the amplitude of said second electrical signals, and comparing the amplitudes of said second electrical signals with the adjusted amplitude of the calibration signal to determine the amount of axial displacement of the blade tip.

3. The method specified in claim 1 including:
    storing each member of said succession of second electrical signals until a successive member signals is about to be produced by the passage of a succeeding blade, whereby the time duration of each member of said succession is lengthened appreciably.

4. The method specified in claim 1 including:
    attaching a magnetic indicator to the shaft of the rotor in relation to one of the blades, and
    positioning a magnetic pickup adjacent to the rotor in cooperating relation to the magnetic indicator whereby an identification signal is produced once per revolution of the rotor.

5. The method specified in claim 2 including:
    displaying the second electrical signals in comparative relation to said adjusted calibration signal.

6. The method specified in claim 1 including:
    displaying the secession of second electrical signals in time sequential relation to the identification signal, whereby each member of said succession can be identified with a particular blade.

7. The method specified in claim 1 including:
    focusing the optical image of the tip of each successive blade tip on an image plane containing an aperture;
    distributing the light from said image which passes through the aperture over a substantial portion of a photosensitive device the electrical output of said device having a linear relationship to the amount of incident light,
    thereby deriving a succession of said first electrical signals.

8. The method specified in claim 1 including:
    applying said first electrical signals as the numerator signal to an electronic divider which also receives a denominator signal, said denominator signal being proportional to the brightness of the sky.

9. The method specified in claim 8 including:
    retaining the electrical signal from the electronic divider after reaching a minimum until restored to a maximum by a trigger signal.

10. A method for determining in-flight the out-of-track distance of the unmodified tips of the rotor blades of a helicopter comprising:
    aiming an electro-optical measuring instrument at a selected field of view through which the tips of the rotor blades pass,
    isolating the instrument so that any change of the elevation angle of the optical axis due to vibration is very slow in comparison with the rotation period of the rotor,
    deriving in synchronism with the rotor a succession of electrical signals whose difference is proportional to the axial displacement of successive blade tips, said difference being substantially independent of the brightness of the sky,
    generating an identification signal in synchronism with the rotor whereby the electrical signal produced by the image of a particular blade may be identified with that blade, and
    obtaining from the derived signals in conjunction with the identification signal an indication of the out-of-track distance of each other rotor blade with respect to said particular blade.

11. The method of claim 10 wherein said succession of electrical signals comprise the quotient output signals from an electronic divider which receives as its denominator an electrical signal which is representative of the background illumination level, whereby said difference is caused to be substantially independent of the brightness of the sky.

12. The method specified in claim 11 including:
applying the signals from the electronic divider to a peak holding amplifier which maintains its output substantially constant after reaching a minimum until restored to maximum by a trigger signal.

13. Apparatus for measuring during flight the distances by which the unmodified tips of a several bladed rotor are out-of-track comprising:
an optical system for focusing an image of the area through which each successive blade tip travels, said optical system focusing an image of the tip of each blade on an image plane as it passes preselected azimuth,
linear signal producing means receiving light from the image and producing therefrom, in synchronism with the rotor a succession of first electrical signals the maximum amplitude of said signals being proportional to the brightness of the sky, said succession containing signals the amplitudes of which are representative of the axial position of each successive blade tip,
signal comparison means for comparing the amplitudes of portions of said first electrical signals which are proportional to the brightness of the sky with the amplitudes of those portions of said first electrical signals which are representative of the axial positions of the several blade tips, thereby deriving a succession of second electrical signals whose differences are proportional to the axial displacement of successive blade tips, said differences being independent of the brightness of the sky,
signal generating means coupled to the rotor said means generating an identification signal in synchronism with rotation of the rotor, and
signal display means accepting said second electrical signals together with the identification signal, said means producing indications of the out-of-track distance of each blade tip, said indications being identified with the individual blades.

14. Apparatus specified in claim 13 wherein said signal comparison means includes a summing amplifier which receives the electrical signals from the signal producing means and also receives a continuous signal of opposite polarity.

15. Apparatus specified in claim 14 wherein said signal comparison means includes an electronic divider which receives the signal from the summing amplifier as its numerator signal, and as its denominator receives a signal proportional to the brightness of the sky, thereby producing from said divider dividend signals proportional to blade tip out-of-track distance which are substantially independent of said brightness.

16. The apparatus specified in claim 15 including a peak holding amplifier which receives the signal from the electronic divider and maintains its output substantially constant after reaching a minimum until restored to maximum by a trigger signal.

17. Apparatus for measuring during flight the distances by which the unmodified tips of a several bladed rotor are out-of-track comprising:
an optical system for focusing an image of the tip of each blade on an image plane as it passes through a preselected field of view
said image comprising a relatively dark area formed by that portion of the blade which is within the field of veiw superimposed on a relatively bright area formed by that portion of the sky which is within the field of view,
image-dissecting means located approximate the image plane;
the image-dissecting means accepting a selected portion of light consituting the image said portion including the interface between said areas;
linear signal producing means coupled to the image-dissecting means receiving the light from the image-dissecting means such that equal amounts of light within any elementary part of said accepted portions will produce an equal amount of electrical signal;
means isolating the apparatus so that any change of the elevation angle of the optical axis due to vibration is very slow in comparison with the rotation period of the rotor.

* * * * *